(12) United States Patent
Miyata et al.

(10) Patent No.: US 10,271,120 B2
(45) Date of Patent: Apr. 23, 2019

(54) SOUND GENERATING DEVICE

(71) Applicant: ANDEN CO., LTD., Anjo, Aichi-pref. (JP)

(72) Inventors: Susumu Miyata, Anjo (JP); Koshiro Hayakawa, Anjo (JP)

(73) Assignee: ANDEN CO., LTD., Anjo, Aichi-pref (JP)

( * ) Notice: Subject to any disclaimer, the term of this patent is extended or adjusted under 35 U.S.C. 154(b) by 0 days.

(21) Appl. No.: 15/755,578

(22) PCT Filed: Aug. 25, 2016

(86) PCT No.: PCT/JP2016/074740
§ 371 (c)(1),
(2) Date: Feb. 27, 2018

(87) PCT Pub. No.: WO2017/038597
PCT Pub. Date: Mar. 9, 2017

(65) Prior Publication Data
US 2018/0262824 A1    Sep. 13, 2018

(30) Foreign Application Priority Data

Sep. 1, 2015    (JP) .................................. 2015-172150
Aug. 4, 2016    (JP) .................................. 2016-153885

(51) Int. Cl.
| | |
|---|---|
| *H04R 1/06* | (2006.01) |
| *G10K 9/12* | (2006.01) |
| *B60Q 5/00* | (2006.01) |
| *G10K 15/04* | (2006.01) |
| *H04R 1/02* | (2006.01) |

(52) U.S. Cl.
CPC .............. *H04R 1/06* (2013.01); *B60Q 5/005* (2013.01); *G10K 9/12* (2013.01); *G10K 15/04* (2013.01); *H04R 1/02* (2013.01); *B60Y 2410/10* (2013.01)

(58) Field of Classification Search
CPC .............. H04R 1/2842; H04R 2499/15; H04R 1/2819; H04R 1/2849; H04R 1/2853; H04R 1/345; H04R 2499/13
USPC .................................................. 381/86, 389
See application file for complete search history.

(56) References Cited

U.S. PATENT DOCUMENTS

2015/0071471 A1*  3/2015  Shao ................... H04R 1/2811
                                                   381/332
2017/0134847 A1    5/2017  Miyata et al.

FOREIGN PATENT DOCUMENTS

| JP | 5650142 B2 | 1/2015 |
| JP | 2016025558 A | 2/2016 |

* cited by examiner

*Primary Examiner* — George C Monikang
(74) *Attorney, Agent, or Firm* — Harness, Dickey & Pierce, P.L.C.

(57) ABSTRACT

In a sound generating device, a connection terminal made of a metal plate material electrically connected to an external equipment has a groove portion in a portion protruding inward of a base. A terminal fitting made of a metal plate material and electrically connected to the sounding body includes a terminal fitting main body that is mechanically joined to the sounding body, and a protrusion plate portion that extends from the terminal fitting main body portion and is press-fitted to the groove portion. The protrusion plate portion press-fitted to the groove portion of the connection terminal is provided integrally with the terminal fitting.

12 Claims, 16 Drawing Sheets

SOUND GENERATING DEVICE

CROSS REFERENCE TO RELATED APPLICATIONS

This application is a U.S. National Phase Application under 35 U.S.C. 371 of International Application No. PCT/JP2016/074740 filed on Aug. 25, 2016 and published in Japanese as WO 2017/038597 A1 on Mar. 9, 2017. This application is based on and claims the benefit of priority from Japanese Patent Applications No. 2015-172150 filed on Sep. 1, 2015, and No. 2016-153885 filed on Aug. 4, 2016. The entire disclosures of all of the above applications are incorporated herein by reference.

TECHNICAL FIELD

The present disclosure relates to a sound generating device that receives an electric signal to generate a sound.

BACKGROUND ART

In the conventional sound generating device of this type, a sounding body and a terminal fitting are electrically connected to each other, and a rod-like lead pin is soldered to the terminal fitting. When the sounding body is inserted into a base and attached to a partition wall of the base, the lead pin is fitted into a groove portion of a connection terminal protruding from the base (for example, refer to Patent Literature 1).

PRIOR ART LITERATURE

Patent Literature

Patent Literature 1: JP 5650142 B2

SUMMARY

However, in the conventional sound generating device, a lead pin is required for electrically connecting the connection terminal to the terminal fitting, which causes an increase in the number of components. In addition, since the lead pin is used, there is a need to solder the terminal fitting to the lead pin. Furthermore, there is a need to fold the lead pin multiple times, resulting in an increase in the number of processing steps.

In view of the above points, an object of the present disclosure is to reduce the number of components and the number of processing steps.

According to an aspect of the present disclosure, a sound generating device includes a sounding body that receives an electric signal and generates a sound, a terminal fitting electrically connected to the sounding body through a conductive member, a base to which the sounding body is attached, and a connection terminal that is fixed to the base in a state of penetrating through the base and has a portion protruding outward of the base and being electrically connected to an external equipment. The connection terminal is made of a metal plate material and has a portion protruding inward of the base and being provided with a groove portion having an open end. The terminal fitting is made of a metal plate material and includes a terminal fitting main body portion mechanically joined to the sounding body and soldered to the conductive member, and a protrusion plate portion that extends from the terminal fitting main body portion and press-fitted to the groove portion from the open end of the groove portion of the connection terminal.

According to the above configuration, because the protrusion plate portion pressed into the groove portion of the connection terminal is provided integrally with the terminal fitting, the number of components can be reduced by elimination of a lead pin in the sound generating device, and the number of processing steps can be reduced by elimination of soldering of the terminal fitting to the lead pin and elimination of bending of the lead pin.

In addition, a load is applied to the protrusion plate portion when the protrusion plate portion of the terminal fitting is press-fitted to the groove portion of the connection terminal, but since the terminal fitting is made of the metal plate material, a shape of the terminal fitting can be easily configured such that transmission of the load to a soldered portion between the conductive member and the terminal fitting main body portion can be reduced.

A length of the protrusion plate portion adjacent to the terminal fitting main body portion, along a direction of press-fitting of the protrusion plate portion to the groove portion, may be larger than a length of the protrusion plate portion adjacent to a tip end of the protrusion plate portion.

According to the above configuration, when the protrusion plate portion of the terminal fitting is pressed into the groove portion of the connection terminal, a deformation of the tip end of the protrusion plate portion can be absorbed, the load can be prevented from being transmitted to the terminal fitting main body portion, and a stress can be prevented from being generated in the soldered portion between the conductive member and the terminal fitting main body portion.

The protrusion plate portion may have a bent portion between an end portion of the protrusion plate portion adjacent to the terminal fitting main body portion and a portion of the protrusion plate portion press-fitted to the groove portion.

According to the above configuration, the forming of the bent portion in the protrusion plate portion of the terminal fitting results in increase of a length of the protrusion plate portion. As a result, when the protrusion plate portion is pressed into the groove portion of the connection terminal, the deformation of the tip end of the protrusion plate portion can be easily absorbed, and the load applied to the soldered portion can be more reliably reduced.

A root portion connected to the terminal fitting main body portion, a fitting portion fitted to the groove portion of the connection terminal, and a curved portion curved between the root portion and the fitting portion may be provided.

According to the above configuration, at least one curved portion is formed on the protrusion plate portion of the terminal fitting, and thereby a distance between the root portion and the fitting portion through the curved portion is increased. For that reason, the protrusion plate portion can absorb, by the curved portion, the vibration generated when the sounding body generates sound, the vibration transmitted from the vehicle to which the sound generating device is attached, or a repetitive stress caused by the expansion and contraction of each constituting member of the sound generating device due to change of environmental temperature. Therefore, the sound generating device reduces the stress acting on the soldered portion connecting the terminal fitting main body portion and the conductive member, making it possible to prevent breakage of the soldered portion. Furthermore, the sound generating device prevents a contact failure between the groove portion of the connection terminal and the fitting portion of the protrusion plate portion, making it possible to reduce a change in an electric resistance value at the contact portion. At least one curved portion may be formed on the protrusion plate portion of the terminal fitting.

The curved portion may be curved along a plane whose normal line is parallel to a plate thickness direction of the metal plate material forming the protrusion plate portion.

According to the above configuration, the metal plate material is sheared during manufacturing the terminal fitting, thereby being capable of forming the root portion, the fitting portion, and the curved portion of the protrusion plate portion at the same time. As a shearing process, for example, there is punching by a press machine and the like. For that reason, the curved portion can be formed without bending the metal plate in a plate thickness direction of the protrusion plate portion. Therefore, a manufacturing process can be simplified, and a manufacturing cost can be reduced.

The curved portion may be curved along an imaginary surface that intersects with a direction in which inner walls of the groove portion fitted to the protrusion plate portion face each other According to the above configuration, the protrusion plate portion of the terminal fitting can be set with a necessary length for the protrusion plate portion without increasing the body size in a direction in which inner walls of the groove portion face each other. Therefore, the sound generating device can downsize the body size of the protrusion plate portion in the direction in which the inner walls of the groove portion face each other.

The curved portion may include a first curved portion that is curved in an arc shape convex from the fitting portion toward the root portion, and a second curved portion that is curved in an arc shape convex from the first curved portion in a direction away from the root portion.

According to the above configuration, the curved portion has the first curved portion and the second curved portion, thereby being capable of more increasing the length of the curved portion. For that reason, the protrusion plate portion can surely absorb, by the first and second curved portions, the vibration generated when the sounding body generates sound, the vibration transmitted from the vehicle to which the sound generating device is attached, or the expansion and contraction of each constituting member of the sound generating device due to a change in an environmental temperature. Therefore, the sound generating device can prevent breakage of the soldered portion connecting the terminal fitting main body portion to the conductive member, and prevent a contact failure between the groove portion of the connection terminal and the fitting portion of the protrusion plate portion. In addition to the first curved portion and the second curved portion, the curved portion may have a third curved portion or the like.

A portion of an outer circumference of the first curved portion facing the root portion may be located closer to the root portion than a portion of an outer circumference of the second curved portion facing away from the root portion is to the root portion.

According to the above configuration, the lengths required for the first curved portion and the second curved portion can be set within a limited space between the terminal fitting main body portion and the connection terminal. With the above configuration, the sound generating device can be displaced in any direction of three dimensions with a low force. For that reason, the protrusion plate portion can surely absorb the vibration generated when the sounding body generates sound, the vibration transmitted from the vehicle to which the sound generating device is attached, or the expansion and contraction of each constituting member of the sound generating device due to a change in an environmental temperature by the curved portions. Therefore, the sound generating device can prevent breakage of the soldered portion connecting the terminal fitting main body portion to the conductive member, and prevent a contact failure between the groove portion of the connection terminal and the fitting portion of the protrusion plate portion.

The terminal fitting may be integrated with the sounding body through a terminal plate made of a resin plate material.

The terminal fitting main body portion may include a terminal fitting main body fixing portion that is in contact with the terminal plate and soldered to the conductive member, a terminal fitting main body movable portion that is separated from the terminal fitting main body fixing portion by a slit portion and not in contact with the terminal plate, and a coupling portion that connects the terminal fitting main body fixing portion to the terminal fitting main body movable portion. The protrusion plate portion may extend from a free end of the terminal fitting main body movable portion toward the connection terminal.

According to the above configuration, when the protrusion plate portion of the terminal fitting is pressed into the groove portion of the connection terminal, not only the protrusion plate portion but also the terminal fitting main body movable portion is deformed. Therefore, the length of the portion to be deformed is increased by an amount corresponding to the terminal fitting main body movable portion, so that the deformation at the distal end side of the protrusion plate portion can be easily absorbed when the protrusion plate portion is pressed into the groove portion, and the load acting on the soldered portion can be more reliably reduced.

The sounding body may include a diaphragm that vibrates to generate sound, a diaphragm drive portion that vibrates the diaphragm, and a frame that houses the diaphragm drive portion. The frame and the terminal plate may be mechanically joined together.

According to another aspect of the present disclosure, a sound generating device includes a sounding body that receives an electric signal to generate sound; a base to which the sounding body is attached; a terminal fitting electrically connected to the sounding body through a conductive member, the terminal fitting having a metal plate which includes a terminal fitting main body portion that is mechanically joined to the sounding body and soldered to the conductive member, and a protrusion plate portion that extends from the terminal fitting main body portion; and a connection terminal having a metal plate fixed to the base in a state of penetrating through the base, the connection terminal being electrically connected to an external equipment outside the base, and the connection terminal having a groove press-fitted to the protrusion plate portion inside the base.

DESCRIPTION OF EMBODIMENTS

Figure 17A:
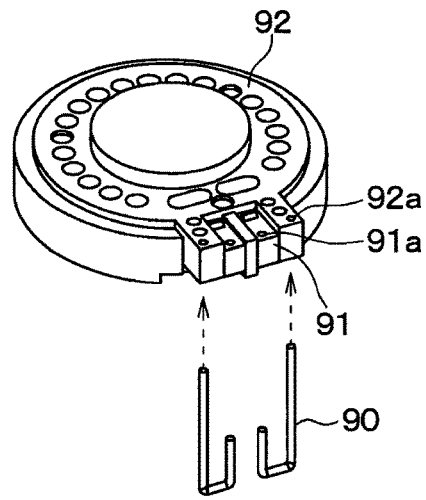
FIG. 17A is a perspective view showing one state during a process of manufacturing the sound generating device in a comparative example of the present disclosure.

First, a comparative example of a sound generating device according to the present disclosure will be described. In an actual product, a configuration and a manufacturing method are employed in which a stress is not generated in a soldered portion between a terminal fitting and a lead pin when the lead pin is fitted into a groove portion of a connection terminal. The structure and the manufacturing method will be described with reference to FIGS. 17A to 17D. First, as shown in FIG. 17A, each of lead pins 90 is bent into a J shape in a single state. Through holes 91a into which the respective lead pins 90 are inserted are provided in a terminal fitting 91. The through holes 92a into which the respective lead pins 90 are inserted are provided in a resin portion of a sounding body 92.

Figure 17B:
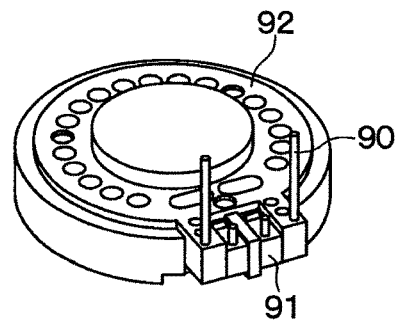
FIG. 17B is a perspective view showing one state during a process of manufacturing the sound generating device in the comparative example.
Figure 17C:
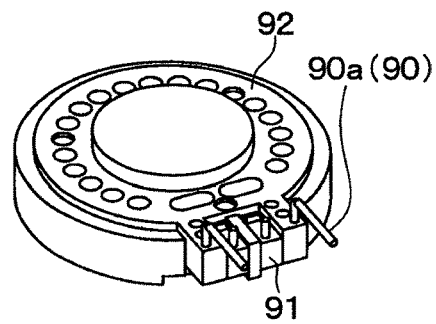
FIG. 17C is a perspective view showing one state during a process of manufacturing the sound generating device in the comparative example.
Figure 17D:
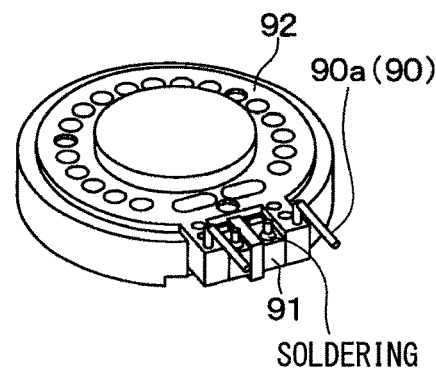
FIG. 17D is a perspective view showing one state during a process of manufacturing the sound generating device in the comparative example.

As shown in FIG. 17B, the lead pins 90 are inserted into the respective through holes 91a and 92a. Subsequently, as shown in FIG. 17C, a portion of each lead pin 90 protruding from the through hole 92a of the sounding body 92 is folded by substantially 90 degrees to form fitting portions 90a to be fitted into groove portions of a connection terminal. Thereafter, as shown in FIG. 17D, the terminal fitting 91 and the lead pins 90 are soldered to each other.

With the above configuration, even when a bending load is applied to the fitting portions 90a of the lead pins 90 when the fitting portions 90a of the lead pins 90 are fitted into the respective groove portions of the connection terminal, the load is not applied to the soldered portions of the terminal fitting 91 and the lead pins 90, and no stress is generated in the soldered portions.

However, in the sound generating device of the comparative example, the lead pins 90 are required for electrically connecting the connection terminal to the terminal fitting 91, resulting in such a problem that the number of components increases. In addition, since the lead pins 90 are used, there is a need to solder the terminal fitting 91 to the lead pins 90. Furthermore, in order to prevent the stress from being generated in the soldered portions, there is a need to fold the lead pins 90 plural times before and after the lead pins 90 are inserted into the respective through holes 91a and 92a, resulting in a problem that the number of processing steps increases.

Hereinafter, multiple aspects for implementing the present disclosure will be described with reference to the drawings. In each aspect, the same reference numerals are assigned to portions corresponding to contents described in a preceding aspect, and repetitive description may be omitted. In each embodiment, when only a part of the configuration is described, another embodiment previously described can be employed for other parts of the configuration. Not only combination between the parts explicitly specified in each of the embodiments to be capable of being combined with each other but also partial combination between the embodiments can be conducted even without explicit expression insofar as the combination is not particularly hindered.

First Embodiment

A first embodiment of the present disclosure will be described. A sound generating device according to the present embodiment can be configured to be mounted on a vehicle and emit a warning sound toward a vehicle exterior.

As shown in FIGS. 1 to 4, a resin base 10 has a substantially rectangular cylindrical shape. A resin cover 12 having a substantially bottomed rectangular cylindrical shape is joined to one opening portion of the base 10 on one end side so as to close one end side of the base 10. A case 14 having a substantially bottomed rectangular cylindrical shape is airtightly joined to the other opening portion of the base 10 on the other end side so as to close the other end side of the base 10.

A sounding body 20 is accommodated in a space defined by the base 10 and the case 14. The sounding body 20 receives an electric signal and generates a sound. The sounding body 20 includes a conical diaphragm 201, a diaphragm drive portion 202, and a metal frame 203. The diaphragm 201 vibrates to generate the sound. The diaphragm drive portion 202 includes a coil and a magnet for vibrating the diaphragm 201. The frame 203 accommodates the diaphragm drive portion 202 and fixes an outer peripheral edge portion of the diaphragm 201.

In the sounding body 20, the frame 203 is mechanically fixed to the base 10 by screws or the like, and the outer peripheral edge portion of the diaphragm 201 is bonded to the base 10 by adhesion.

The coil of the diaphragm drive portion 202 is electrically connected to a terminal fitting 24 made of a conductive metal plate material (for example, brass) through a tinsel wire 22 serving as a conductive member. Both of the diaphragm drive portion 202 and the tinsel wire 22, and both of the tinsel wire 22 and the terminal fitting 24 are soldered to each other.

A plate-shaped terminal plate 26 made of a resin is joined to the frame 203 by swaging, and the terminal fitting 24 is joined to the terminal plate 26 by swaging. In other words, the terminal fitting 24 is integrated with the frame 203 of the sounding body 20 through the terminal plate 26.

The terminal fitting 24 is electrically connected to an external equipment through connection terminals 28 each made of a conductive metal (for example, brass) plate material. An electric signal (that is, a sound source signal) from the external equipment is input to the coil of the diaphragm drive portion 202 along a path of the connection terminals 28, the terminal fittings 24, and the tinsel wire 22. In the sounding body 20, the diaphragm drive portion 202 receives the electric signal from the external equipment and vibrates the diaphragm 201, to thereby generate the sound.

The sound generated by the sounding body 20 propagates through a sound passage defined in the base 10 and the cover 12 and is emitted to the outside from sound emission holes 121 defined in the cover 12 as a warning sound.

In order to reduce a pressure variation caused by a temperature change in a sealed space defined by the base 10, the case 14, and the sounding body 20, a through hole (not illustrated) through which the space defined by the base 10, the case 14, and the sounding body 20 communicates with the outside is provided in the base 10. The through hole is covered with a pressure adjustment film (not illustrated) made of fibers having a property of ventilation but no water permeability.

The connection terminal 28 is fixed to the base 10 in a state penetrating through an outer peripheral wall of the base 10. More specifically, the connection terminal 28 is pressed into the base 10 after the base 10 has been molded, or is formed in the base 10 as an insert material when the base 10 is molded. The connection terminal 28 is made of a metal plate material (metal plate).

A cylindrical connector housing 101 for external harness is protruded from an outer peripheral surface of the base 10, and a portion of the connection terminal 28 protruding to the outside of the base 10 is located inside the connector housing 101.

A portion of the connection terminal 28 which protrudes into the interior of the base 10 (hereinafter referred to as an inner portion of the connection terminal 28) is bent at a right angle so that a tip portion of the portion faces the case 14 side.

Groove portions 281 (grooves) having a tip surface (that is, a surface facing the case 14) opened are provided on the tip end side of the inner portions of the respective connection terminals 28. The groove portions 281 extend from the tip surface toward the bent portion side.

Next, the terminal fittings 24 and the terminal plate 26 will be described with reference to FIGS. 5A to 6.

Figure 5A:
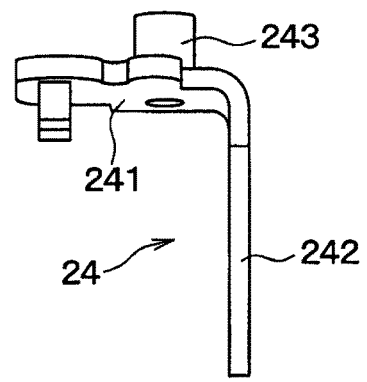
FIG. 5A is a front view of a terminal fitting in the sound generating device according to the first embodiment.
Figure 5B:
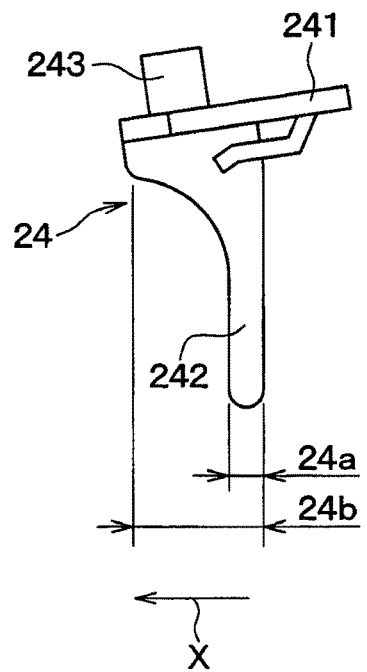
FIG. 5B is a left side view of the terminal fitting in the sound generating device according to the first embodiment.
Figure 5C:
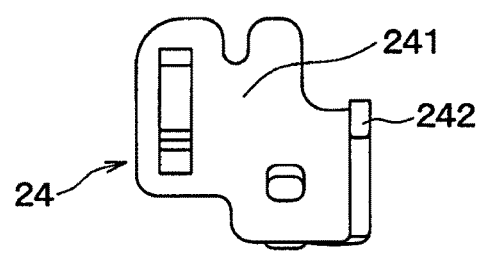
FIG. 5C is a bottom view of the terminal fitting in the sound generating device according to the first embodiment.
Figure 6:
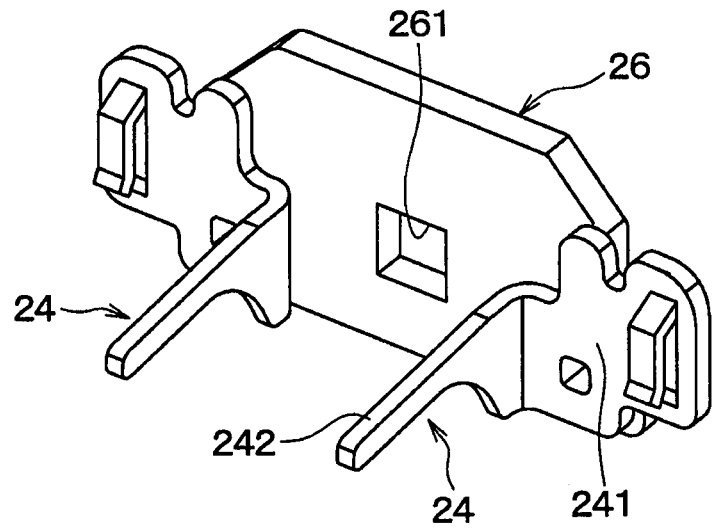
FIG. 6 is a perspective view of the terminal fitting and a terminal plate in the sound generating device according to the first embodiment.

The terminal fittings 24 are machined into shapes shown in FIGS. 5A, 5B and 5C with the use of a mold. Specifically, in each of the terminal fittings 24, a terminal fitting main body portion 241 and a protrusion plate portion 242 are disposed in an L shape. Each of swaging protrusion portions 243 used for swaging joint with the terminal plate 26 protrudes from one end face of the terminal fitting main body portion 241. The terminal fitting 24 is subjected to tin plating. Specifically, the terminal fitting 24 may be subjected to tin plating after processing with a die, or may be machined with the mold after a material has been subjected to the tin plating.

Then, after each of the swaging protrusion portions 243 has been inserted into a terminal plate through hole (not illustrated) provided in the terminal plate 26, a tip end of the swaging protrusion 243 is plastically deformed. As a result, as shown in FIG. 6, the terminal fitting main body portion 241 is mechanically joined to the terminal plate 26. In a state in which the terminal fitting main body portion 241 is mechanically joined to the terminal plate 26, each protrusion plate portion 242 extends from one end of the terminal fitting main body portion 241 in a direction away from the terminal plate 26.

A terminal plate through hole 261 used for swaging joint with the frame 203 is provided in the terminal plate 26. The terminal plate 26 is formed by punching.

Then, in a state where the terminal fitting 24 and the terminal plate 26 are integrated together, the protrusion portion (not illustrated) provided in the frame 203 is inserted into the terminal plate through hole 261 and the tip end of the protrusion portion is plastically deformed. As a result, the terminal plate 26 is mechanically joined to the frame 203, and the terminal fittings 24 and the terminal plate 26 are integrated with the frame 203.

In this case, a unit in which the sounding body 20, the tinsel wire 22, the terminal fittings 24, and the terminal plate 26 are integrated together is referred to as a sounding body aggregate 2.

Figure 7:
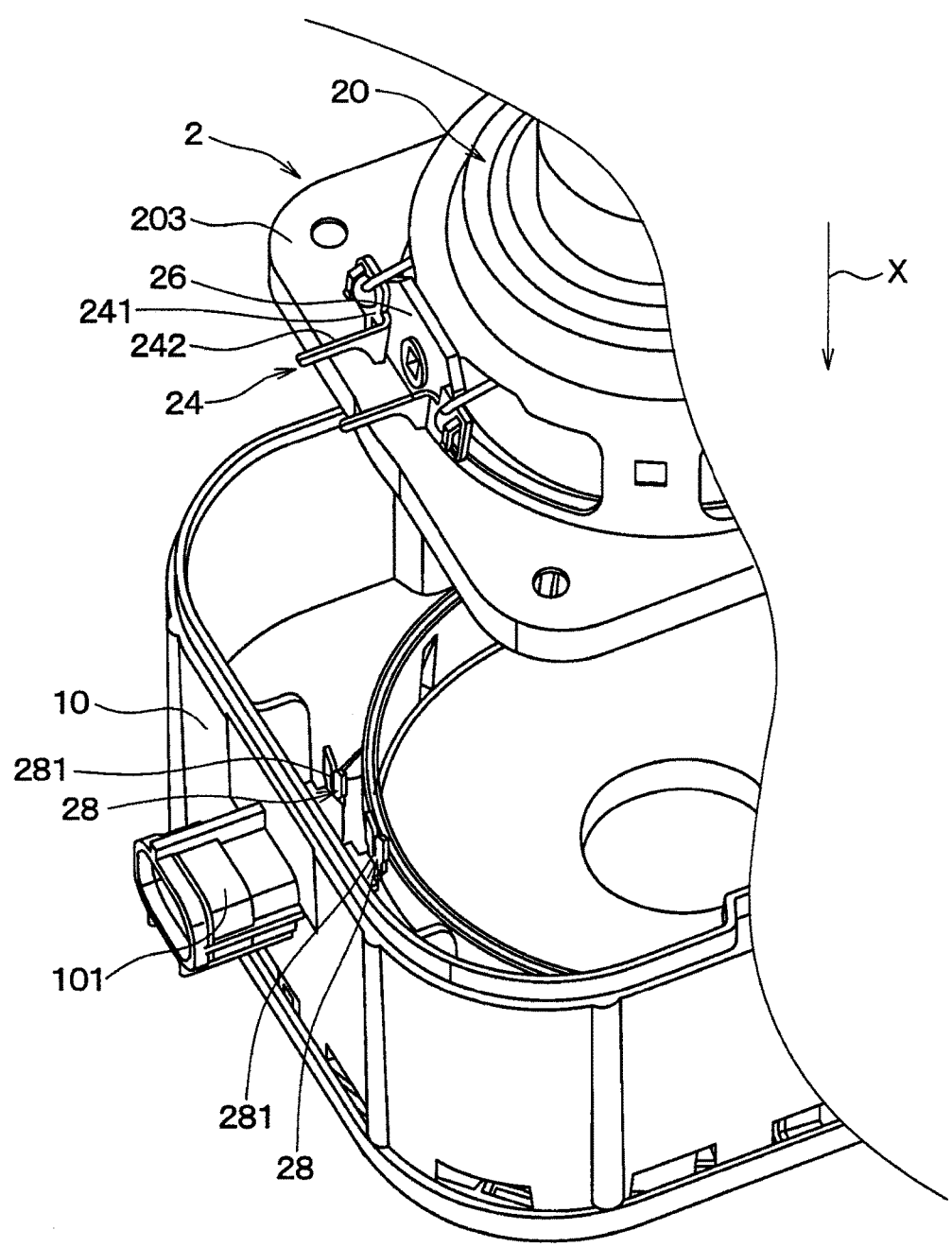
FIG. 7 is a perspective view showing a state where a sounding body in the sound generating device is attached to a base according to the first embodiment.
Figure 8A:
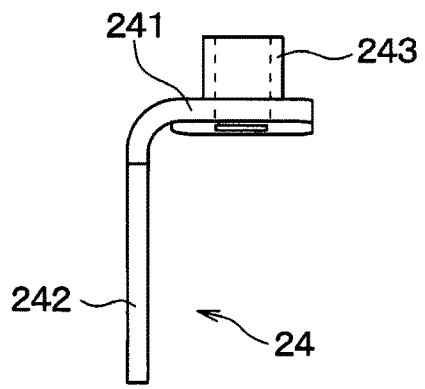
FIG. 8A is a front view of a terminal fitting in a sound generating device according to a second embodiment of the present disclosure.
Figure 8B:
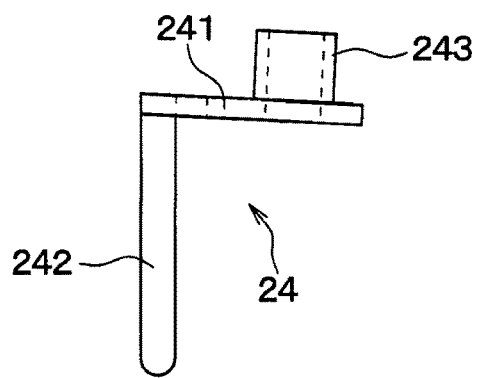
FIG. 8B is a right side view of the terminal fitting in the sound generating device according to the second embodiment.
Figure 8C:
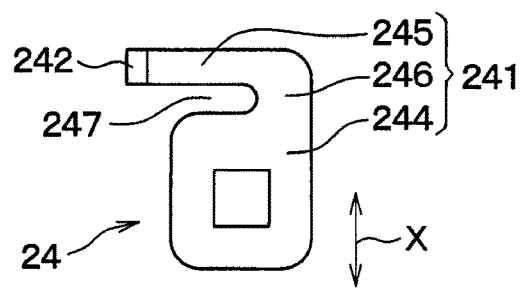
FIG. 8C is a bottom view of the terminal fitting in the sound generating device according to the second embodiment.
Figure 9A:
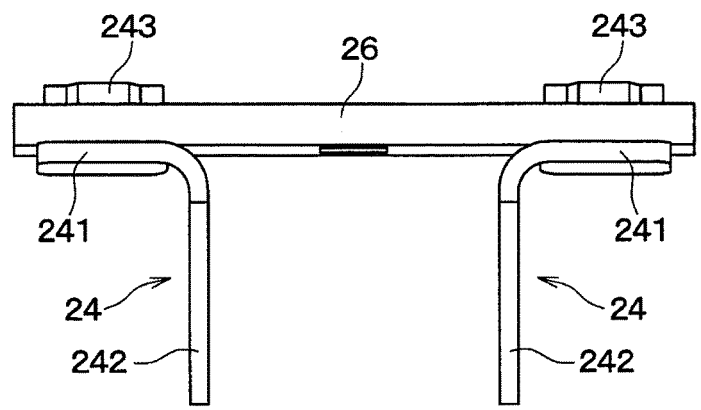
FIG. 9A is a front view of the terminal fitting and a terminal plate in the sound generating device according to the second embodiment.
Figure 9B:
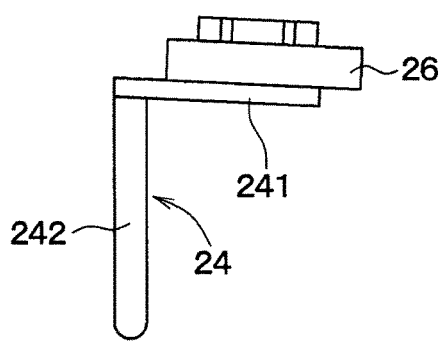
FIG. 9B is a right side view of the terminal fitting and the terminal plate in the sound generating device according to the second embodiment.
Figure 9C:
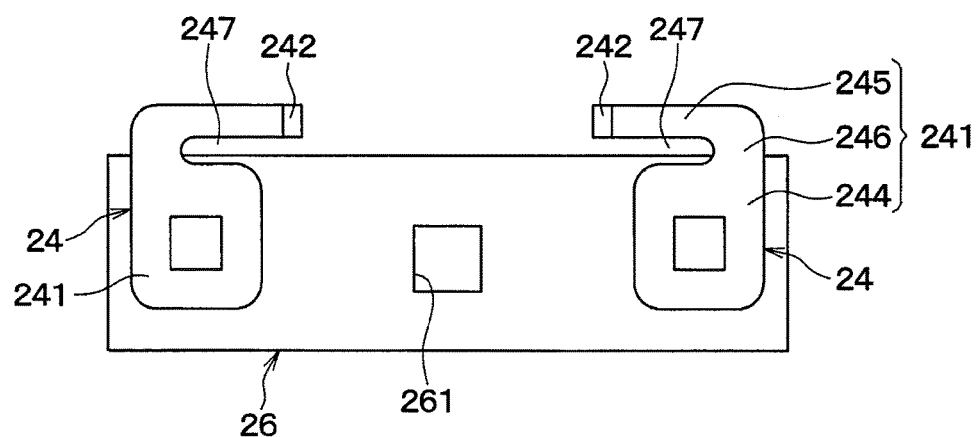
FIG. 9C is a bottom view of the terminal fitting and the terminal plate in the sound generating device according to the second embodiment.

As shown in FIG. 7, when the sounding body aggregate 2 is assembled to the base 10, the sounding body aggregate 2 is moved in a direction indicated by an arrow X. Hereinafter, the direction indicated by arrow X is referred to as a moving direction X. More specifically, the moving direction X is a direction from one side of the base 10 to which the case 14 is joined to the other side of the base 10 to which the cover 12 is joined, and a direction in which each protrusion plate portion 242 is pressed into the groove portion 281.

Figure 1:
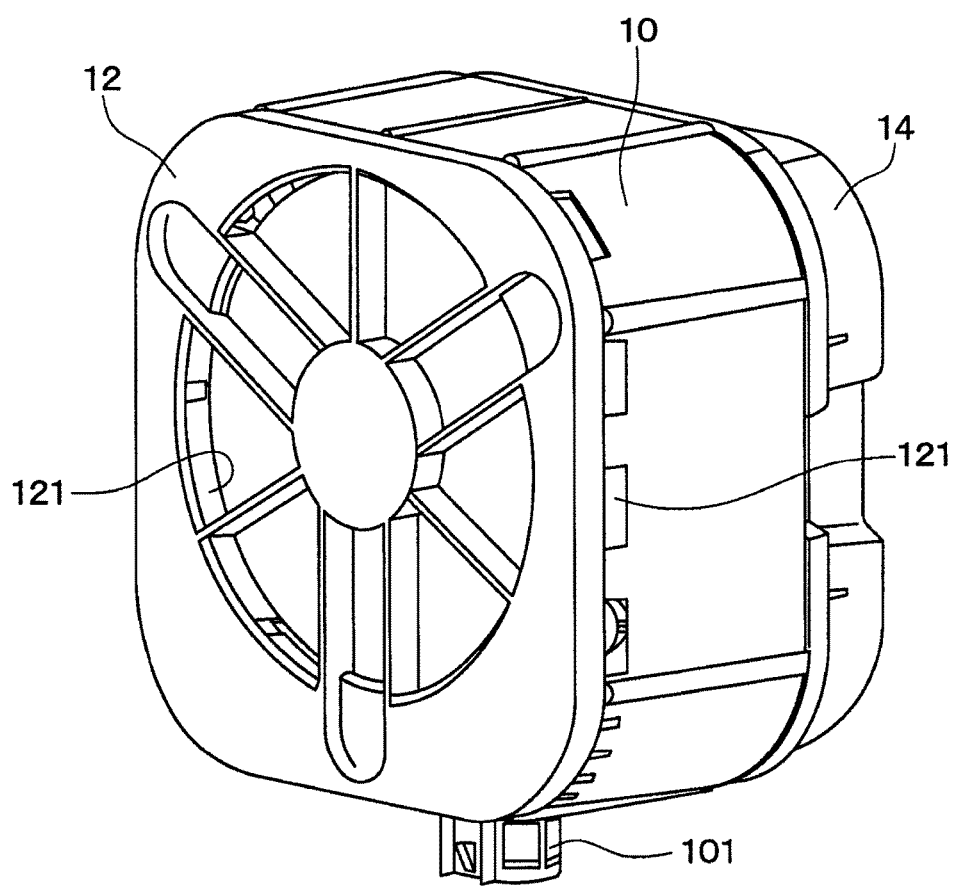
FIG. 1 is a perspective view of a sound generating device according to a first embodiment of the present disclosure.
Figure 2:
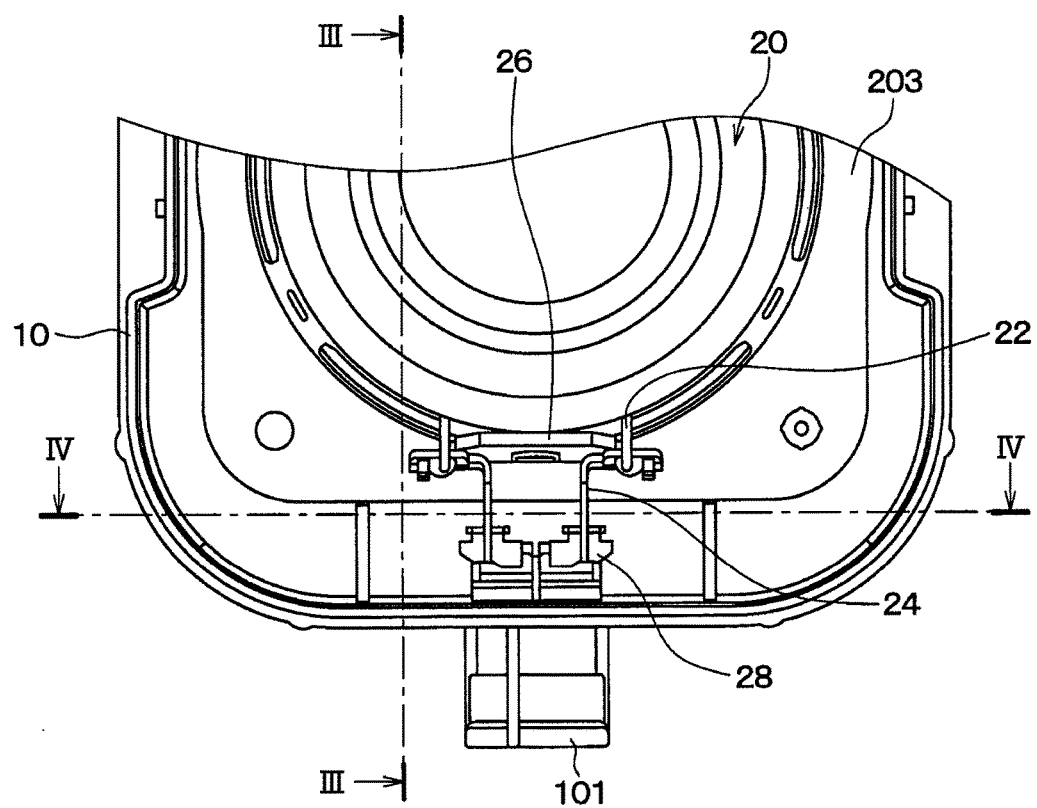
FIG. 2 is a front view of the sound generating device in a state in which a case is removed according to the first embodiment.

When viewing the sounding body aggregate 2 along the moving direction X, most of the protrusion plate portion 242 protrudes outward from the outer peripheral edge portion of the frame 203 (refer to FIG. 2).

In a dimension of the protrusion plate portion 242 in the moving direction X, a dimension 24b closer to the terminal fitting main body 241 is larger than a dimension 24a on the tip end side of the protrusion plate portion 242 (that is, a side far from the terminal fitting main body portion 241 (refer to FIGS. 5A to 5C).

In the present embodiment, the dimension 24a on the distal end side of the protrusion plate portion 242 in the moving direction X is set to about 1.5 mm. Further, a thickness of the terminal fitting 24 is set to about 0.8 mm. Further, a width of the groove portion 281 is slightly narrower than a thickness of the terminal fitting 24. Specifically, a width of the groove portion 281 is set to about 0.65 mm.

Figure 3:
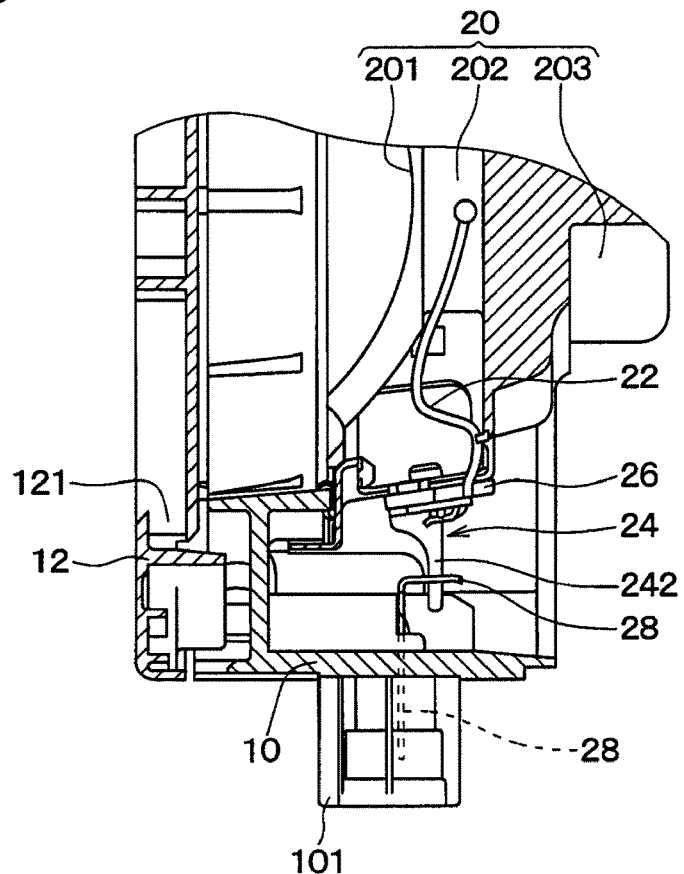
FIG. 3 is a cross-sectional view taken line III-III of FIG. 2.
Figure 4:
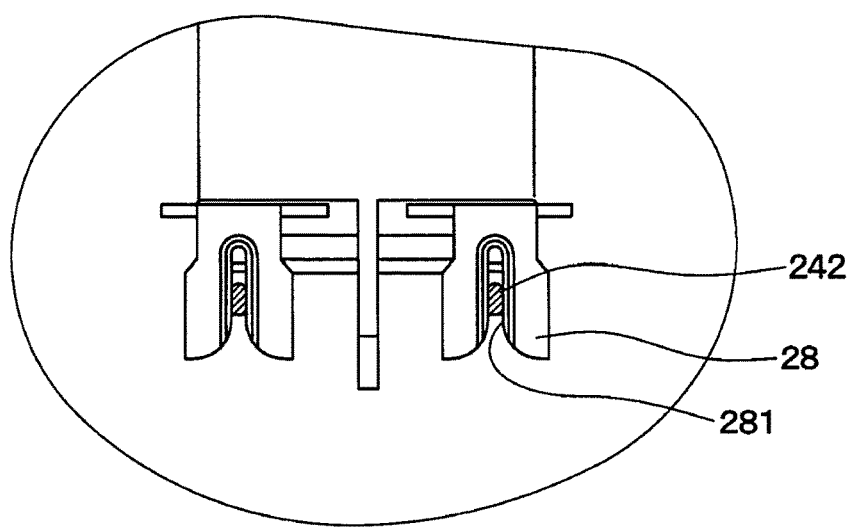
FIG. 4 is a cross-sectional view of a line IV-IV in FIG. 2.

When the sounding body aggregate 2 is assembled to the base 10, as shown in FIGS. 2 to 4, the protrusion plate portion 242 of each terminal fitting 24 is pressed into the groove portion 281 of the connection terminal 28 by the movement of the sounding body aggregate 2. As a result, the terminal fitting 24 and the connection terminal 28 are electrically connected to each other.

At that time, when positions of the protrusion plate portion 242 and the groove portion 281 when viewed along the moving direction X are displaced from each other, the protrusion plate portion 242 is deformed so as to positionally coincide with the groove portion 281, and inserted into the groove portion 281.

According to the present embodiment, because the protrusion plate portion 242 pressed into the groove portion 281 of the connection terminal 28 is provided integrally with the terminal fitting 24, the number of components can be reduced with an elimination of a lead pin in the sound generating device of the comparative example, and the number of processing steps can be reduced with the elimination of soldering of the terminal fitting to the lead pin and bending of the lead pin.

In addition, since the terminal fitting 24 is made of the metal plate material (metal plate), a shape that makes it difficult to transmit a load applied to the protrusion plate portion 242 when the protrusion plate portion 242 is pressed into the groove portion 281 to a soldered portion between the tinsel wire 22 and the terminal fitting main body portion 241 can be easily set.

Further, since in the dimension of the protrusion plate portion 242 in the moving direction X, the dimension 24b on a side closer to the terminal fitting main body 241 is larger than the dimension 24a on the distal end side of the protrusion plate portion 242, when the protrusion plate portion 242 is pressed into the groove portion 281, the deformation of the distal end side of the protrusion plate portion 242 is absorbed, and the load to be applied to the terminal fitting main body portion 241 can be reduced.

Second Embodiment

A second embodiment will be described with reference to FIGS. 8A to 10. In the present embodiment, terminal fittings 24 are different from those in the first embodiment. In the present embodiment, a description of the parts identical with or equivalent to those in the first embodiment will be omitted or simplified.

As shown in FIGS. 8A to 9C, a terminal fitting main body portion 241 includes a terminal fitting main body fixing portion 244, a terminal fitting main body movable portion 245, and a coupling portion 246. The terminal metal main body fixing portion 244 abuts against a terminal plate 26. The terminal metal main body movable portion 245 does not abut against the terminal plate 26. The coupling portion 246 connects the terminal fitting main body fixing portion 244 to the terminal fitting main body movable portion 245. The terminal fitting main body fixing portion 244 and the terminal fitting main body movable portion 245 are separated from each other by a slit portion 247.

The terminal fitting main body movable portion 245 and a protrusion plate portion 242 are continuous to each other. A dimension of the terminal fitting main body movable portion 245 in a moving direction X and a dimension of the protrusion plate portion 242 in the moving direction X are equal to each other and kept constant.

The terminal fitting main body movable portion 245 and the protrusion plate portion 242 are disposed in an L shape, and the protrusion plate portion 242 extends from a free end of the terminal fitting main body movable portion 245 toward a connection terminal 28 side.

A swaging protrusion portion 243 is formed in a cylindrical shape having a through hole. Then, after the swaging protrusion portion 243 has been inserted into a terminal plate through hole (not illustrated) provided in the terminal plate 26, a tip end of the swaging protrusion portion 243 is plastically deformed. As a result, the terminal fitting main body portion 241 is mechanically joined to the terminal plate 26.

Figure 10:
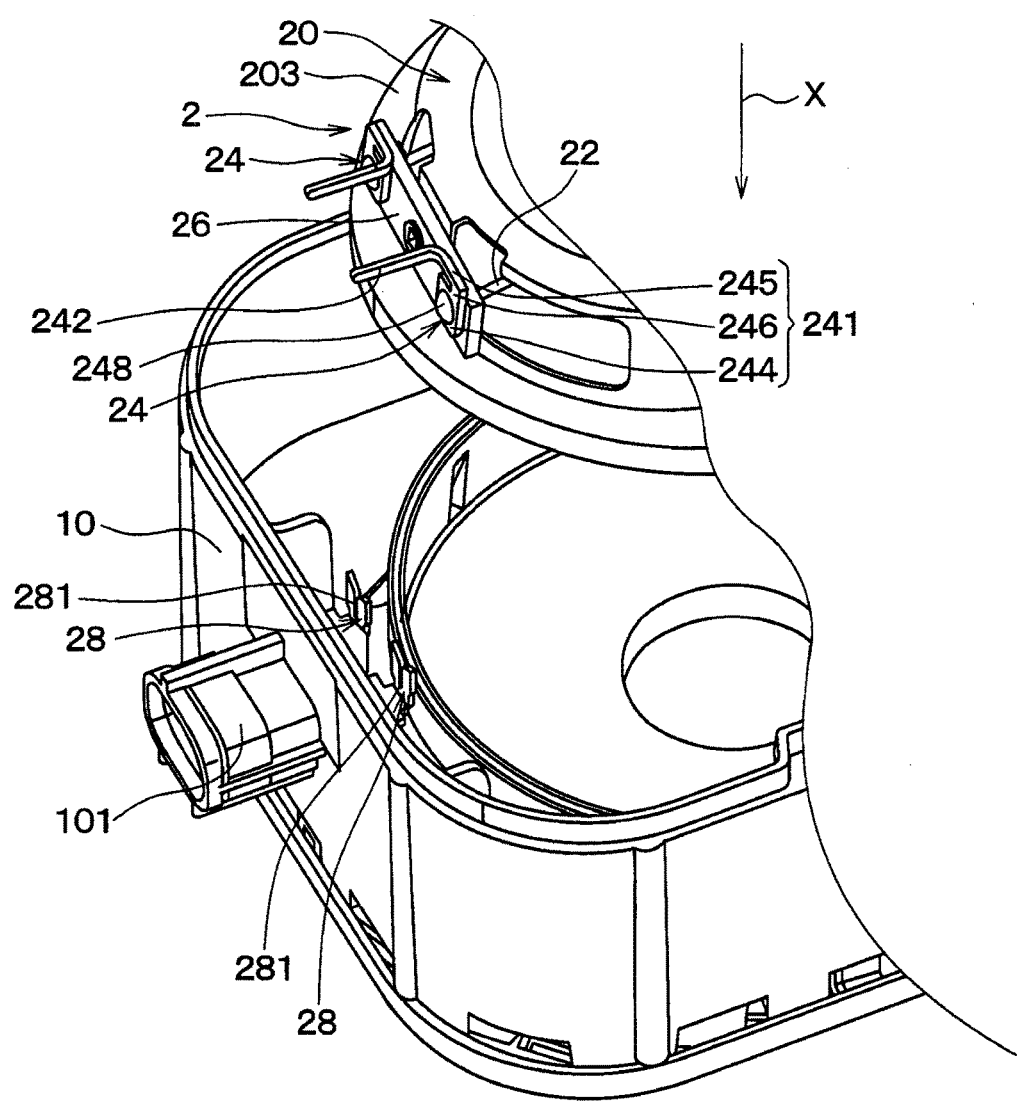
FIG. 10 is a perspective view showing a state where a sounding body in the sound generating device is attached to a base according to the second embodiment.
Figure 11A:
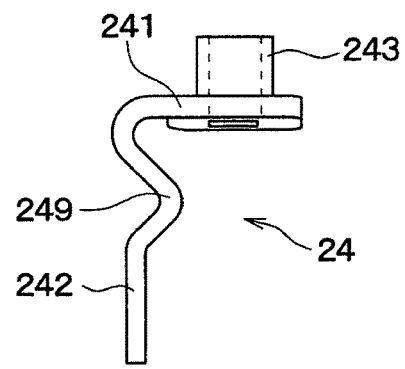
FIG. 11A is a front view of a terminal fitting in a sound generating device according to a third embodiment of the present disclosure.
Figure 11B:
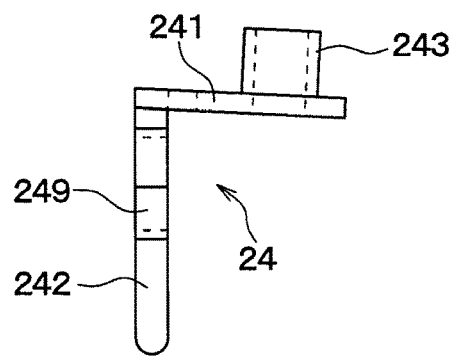
FIG. 11B is a right side view of the terminal fitting in the sound generating device according to the third embodiment.
Figure 11C:
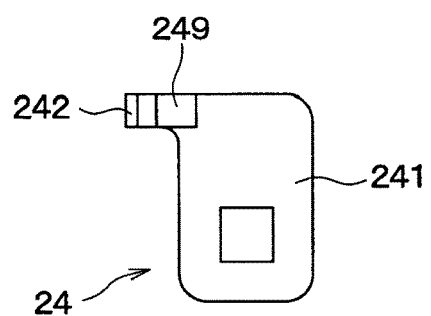
FIG. 11C is a bottom view of the terminal fitting in the sound generating device according to the third embodiment.
Figure 12A:
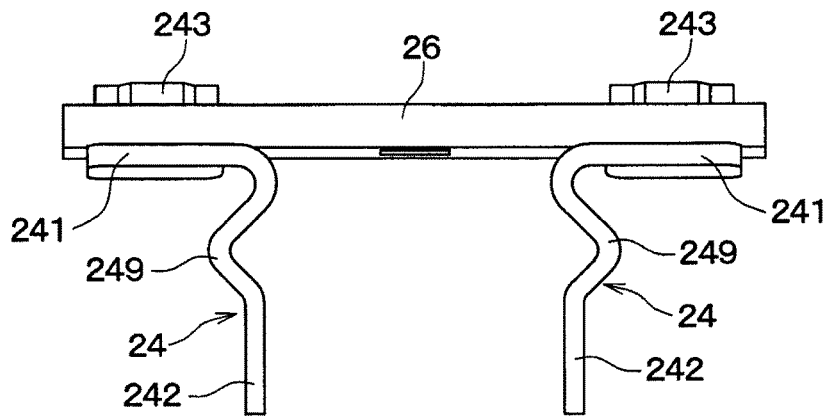
FIG. 12A is a front view of the terminal fitting and a terminal plate in the sound generating device according to the third embodiment.
Figure 12B:
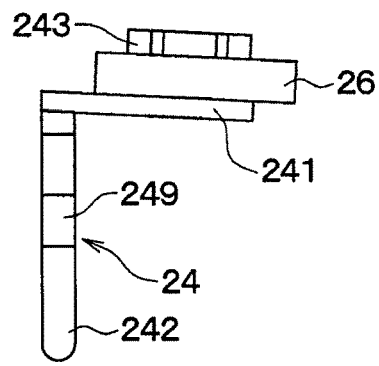
FIG. 12B is a right side view of the terminal fitting and the terminal plate in the sound generating device according to the third embodiment.
Figure 12C:
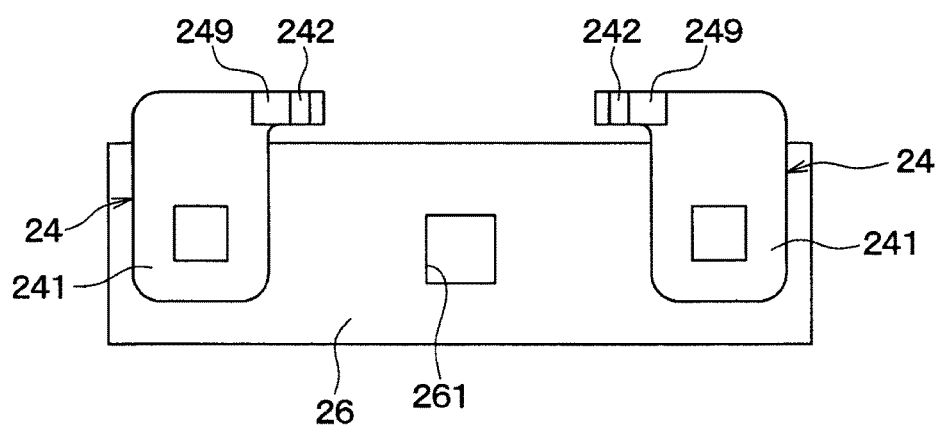
FIG. 12C is a bottom view of the terminal fitting and the terminal plate in the sound generating device according to the third embodiment.

As shown in FIG. 10, after the terminal fitting main body portion 241 and the terminal plate 26 have been joined to each other, the tinsel wire 22 is inserted into a through hole of the swaging protrusion portion 243, and the tinsel wire 22 is soldered to the terminal fitting main body fixing portion 244. A portion denoted by reference numeral 248 is a soldered portion obtained by soldering the tinsel wire 22 to the terminal fitting main body fixing portion 244.

In the case where positions of the protrusion plate portion 242 and the groove portion 281 when viewed along the moving direction X are displaced from each other in assembling the sounding body aggregate 2 to the base 10, the protrusion plate portion 242 and the terminal fitting main body movable portion 245 are deformed so that the protrusion plate portion 242 positionally coincides with the groove portion 281. The protrusion plate portion 242 is inserted into the groove portion 281.

According to the present embodiment, the number of components can be reduced with an elimination of a lead pin in the sound generating device of the comparative example, and the number of processing steps can be reduced with the elimination of soldering of the terminal fitting to the lead pin and bending of the lead pin.

In addition, since the terminal fitting 24 is made of the metal plate material, a shape that makes it difficult to transmit a load applied to the protrusion plate portion 242 when the protrusion plate portion 242 is pressed into the groove portion 281 to a soldered portion 248 between the tinsel wire 22 and the terminal fitting main body fixing portion 244 can be easily set.

When the protrusion plate portion 242 is pressed into the groove portion 281, if the positions of the protrusion plate portion 242 and the groove portion 281 are displaced from each other, not only the protrusion plate portion 242 but also the terminal fitting main body movable portion 245 is deformed. Therefore, the length of the portion to be deformed is increased by an amount corresponding to the terminal fitting main body movable portion 245, so that the deformation at the distal end side of the protrusion plate portion 242 can be easily absorbed when the protrusion plate portion 242 is pressed into the groove portion 281, and the load acting on the soldered portion 248 can be more reliably reduced.

Third Embodiment

A third embodiment will be described with reference to FIGS. 11A to 13. In the present embodiment, terminal fittings 24 are different from those in the first embodiment. In the present embodiment, a description of the parts identical with or equivalent to those in the first embodiment will be omitted or simplified.

As shown in FIGS. 11A to 12C, in a protrusion plate portion 242, a bent portion 249 is formed between an end portion of the protrusion plate portion 242 on a terminal fitting main body portion 241 side and a portion of the protrusion plate portion 242 which is pressed into a groove portion 281. Specifically, the bent portion 249 is formed by bending the protrusion plate portion 242 multiple times.

A swaging protrusion portion 243 is formed in a cylindrical shape having a through hole. Then, after the swaging protrusion portion 243 has been inserted into a terminal plate through hole (not illustrated) provided in a terminal plate 26, a tip end of the swaging protrusion portion 243 is plastically deformed. As a result, the terminal fitting main body portion 241 is mechanically joined to the terminal plate 26.

Figure 13:
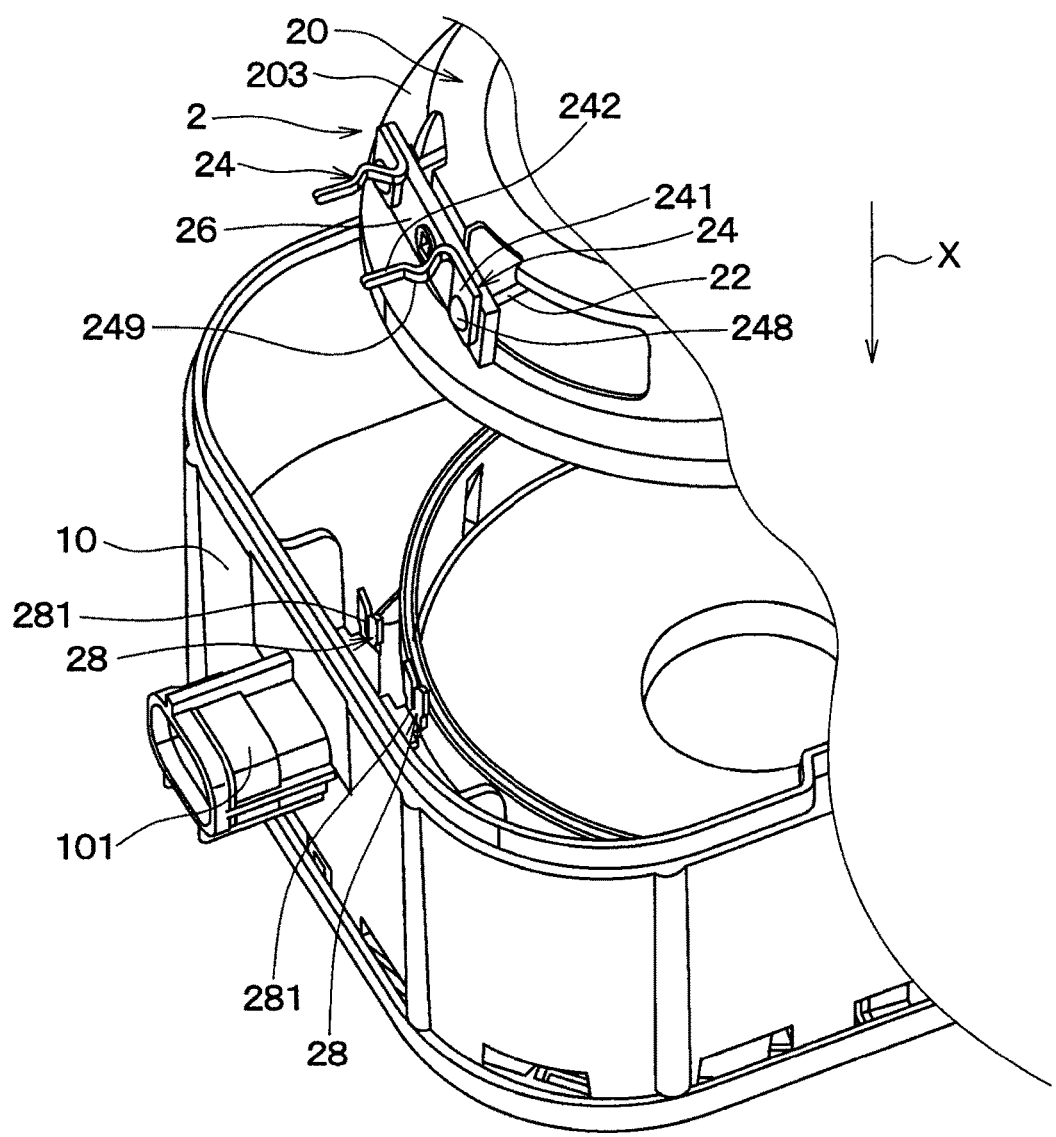
FIG. 13 is a perspective view showing a state where a sounding body in the sound generating device is attached to a base according to the third embodiment.

As shown in FIG. 13, after the terminal fitting main body portion 241 and the terminal plate 26 have been joined to each other, a tinsel wire 22 is inserted into a through hole of the swaging protrusion portion 243, and the tinsel wire 22 is soldered to the terminal fitting main body 241. A portion denoted by reference numeral 248 is a soldered portion obtained by soldering the tinsel wire 22.

In the case where positions of the protrusion plate portion 242 and the groove portion 281 when viewed along a moving direction X are displaced from each other in assembling a sounding body aggregate 2 to a base 10, the protrusion plate portion 242 is deformed so as to positionally coincide with the groove portion 281. The protrusion plate portion 242 is inserted into the groove portion 281.

According to the present embodiment, the number of components can be reduced with an elimination of the lead pin in the sound generating device of the comparative example, and the number of processing steps can be reduced with the elimination of soldering of the terminal fitting to the lead pin and bending of the lead pin.

In addition, since the terminal fitting 24 is made of the metal plate material, a shape that makes it difficult to transmit a load applied to the protrusion plate portion 242 when the protrusion plate portion 242 is pressed into the groove portion 281 to the soldered portion 248 between the tinsel wire 22 and the terminal fitting main body portion 241 can be easily set.

In addition, the bent portion 249 is formed in the protrusion plate portion 242, to thereby increase a length of the protrusion plate portion 242. When the protrusion plate portion 242 is pressed into the groove portion 281, the deformation of the distal end side of the protrusion plate portion 242 can be easily absorbed, and the load applied to the soldered portion 248 can be more reliably reduced.

Fourth Embodiment

A fourth embodiment will be described with reference to FIGS. 14A to 16. In the fourth embodiment, terminal fittings 24 are different from those in the first to third embodiments. In the fourth embodiment, a description of the parts identical with or equivalent to those in the first embodiment will be omitted or simplified.

Figure 14A:
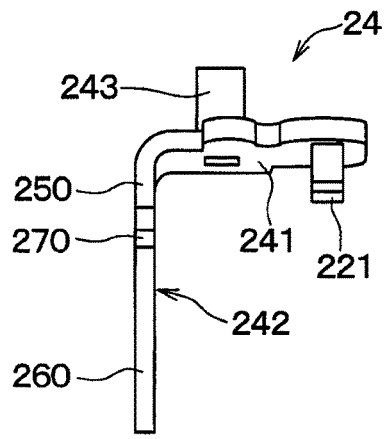
FIG. 14A is a front view of a terminal fitting in a sound generating device according to a fourth embodiment of the present disclosure.
Figure 14B:
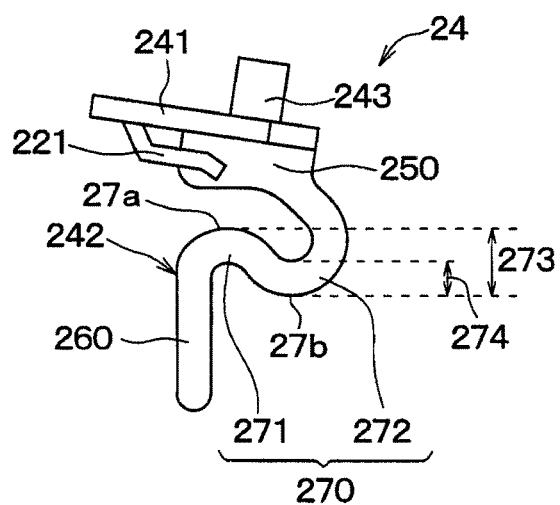
FIG. 14B is a right side view of the terminal fitting in the sound generating device according to the fourth embodiment.
Figure 14C:
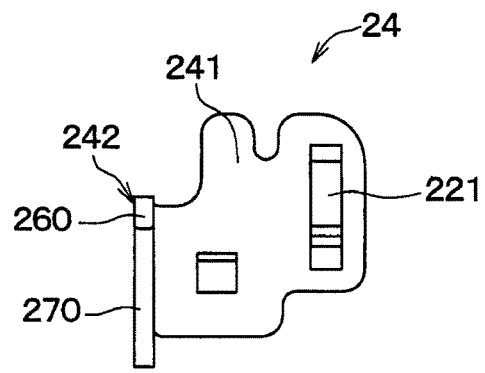
FIG. 14C is a bottom view of the terminal fitting in the sound generating device according to the fourth embodiment.

As shown in FIGS. 14A, 14B and 14C, the terminal fitting 24 according to the fourth embodiment also includes a terminal fitting main body portion 241, a protrusion plate portion 242, and a swaging protrusion portion 243. However, the protrusion plate portion 242 of the terminal fitting 24 according to the fourth embodiment has a root portion 250, a fitting portion 260, and a curved portion 270. The root portion 250 is a portion of the protrusion plate portion 242 which is connected to the terminal fitting main body portion 241. The fitting portion 260 is a portion of the protrusion plate portion 242 which is pressed into a groove portion 281 of a connection terminal 28, and fitted between the inner walls of the groove portion 281. The curved portion 270 is a portion of the protrusion plate portion 242 which is formed so as to be curved between the root portion 250 and the fitting portion 260.

The curved portion 270 is curved along a plane having a normal line in a plate thickness direction of the metal plate material forming the protrusion plate portion 242. Therefore, the metal plate material is punched during manufacturing the terminal fitting 24, thereby being capable of forming the protrusion plate portion 242 having the root portion 250, the fitting portion 260, and the curved portion 270 and the terminal fitting main body portion 241 at the same time. In detail, after the outer shapes of the protrusion plate portion 242 and the terminal fitting main body portion 241 are punched out by punching the metal plate material serving as a base material, the terminal fitting 24 is formed by bending on a boundary between the protrusion plate portion 242 and the terminal fitting main body portion 241.

The curved portion 270 according to the fourth embodiment has a first curved portion 271 and a second curved portion 272. The first curved portion 271 is a portion curved in an arc shape convex from the fitting portion 260 toward the root portion 250 side. The second curved portion 272 is a portion curved in an arc shape convex from the first curved portion 271 toward the side opposite to the root portion 250. The curved portion 270 is not limited to the configuration having the first curved portion 271 and the second curved portion 272, but may have at least one curved portion, and a shape of the curved portion is not limited to the circular arc shape, and may be curved in a prismatic shape.

The first curved portion 271 is curved at an angle smaller than 90°. For that reason, as indicated by an arrow 273 in FIG. 14B, a portion 27a of the outer periphery of the first curved portion 271 on the root portion 250 side is located closer to the root portion 250 than a portion 27b of the outer periphery of the second curved portion 272 on the side opposite to the root portion 250. As indicated by an arrow 273, it is preferable that a distance between the portion 27a of the outer periphery of the first curved portion 271 on the root portion 250 side and the portion 27b of the outer periphery of the second curved portion 272 on the side opposite to the root portion 250 is larger than the width of the curved portion 270. Incidentally, a width of the curved portion 270 is indicated by an arrow 274. With the above configuration, the curved portion 270 is formed in an S shape when the protrusion plate portion 242 is viewed from the plate thickness direction.

Figure 15A:
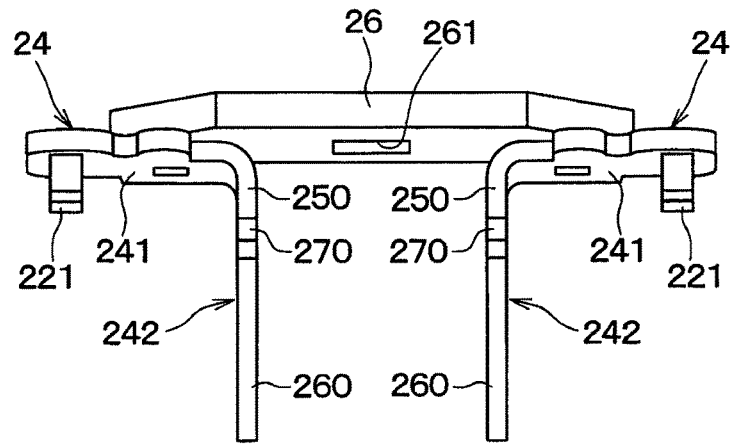
FIG. 15A is a front view of the terminal fitting and a terminal plate in the sound generating device according to the fourth embodiment.
Figure 15B:
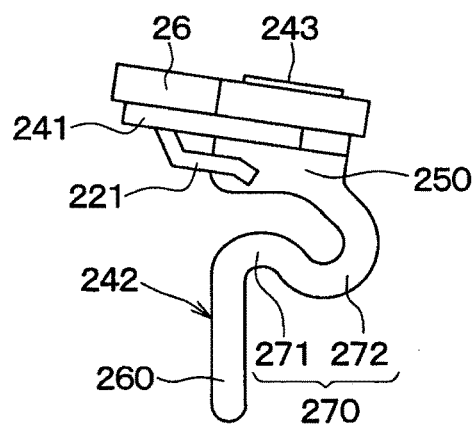
FIG. 15B is a right side view of the terminal fitting and the terminal plate in the sound generating device according to the fourth embodiment.
Figure 15C:
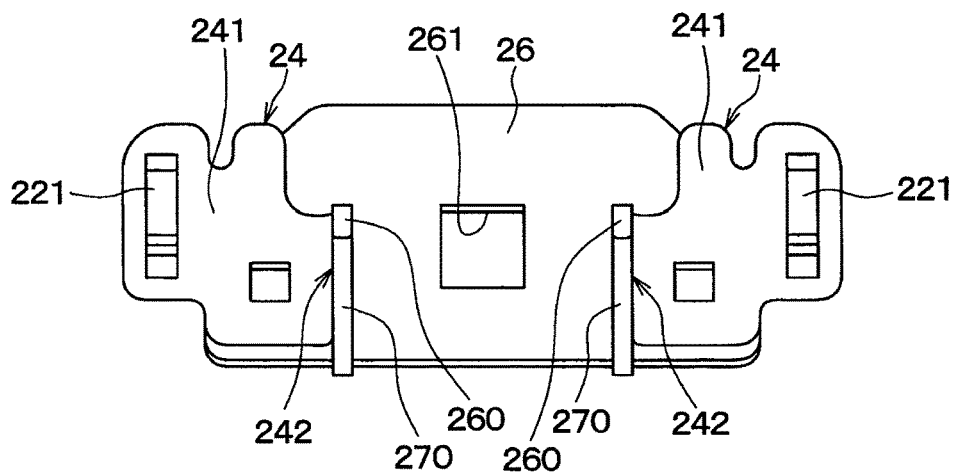
FIG. 15C is a bottom view of the terminal fitting and the terminal plate in the sound generating device according to the fourth embodiment.

Similarly to the first to third embodiments, the swaging protrusion portion 243 is formed in a cylindrical shape having a through hole inside. As shown in FIGS. 15A, 15B, and 15C, after each of the swaging protrusion portions 243 has been inserted into a terminal plate through hole (not illustrated) provided in a terminal plate 26, a tip end of the swaging protrusion portion 243 is plastically deformed. As a result, the terminal fitting main body portion 241 is mechanically joined to the terminal plate 26. The terminal fitting 24, the terminal plate 26, and a sounding body 20 are integrated together to form a sounding body aggregate 2. The sounding body aggregate 2 is assembled to a base 10.

Figure 16:
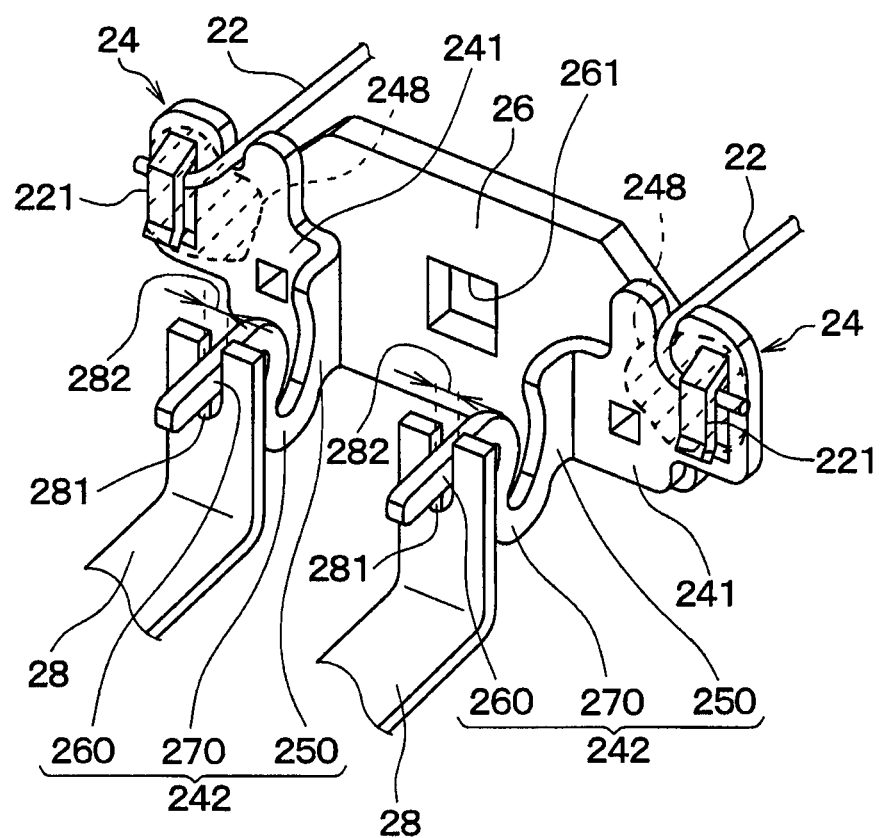
FIG. 16 is a perspective view of the terminal fitting and the terminal plate in the sound generating device according to the fourth embodiment.

FIG. 16 shows a part of a state in which the sounding body aggregate 2 is attached to the base 10. In that state, the fitting portion 260 of the terminal fitting 24 is pressed into the groove portion 281 of the connection terminal 28 fixed to the base 10, and is fitted between the inner walls of the groove portion 281. An arrow 282 in FIG. 16 indicates a direction in which the inner walls of the groove portion 281 face each other. The curved portion 270 of the terminal fitting 24 described above is curved along an imaginary surface that intersects with the direction 282 in which the inner walls of the groove portion 281 face each other. The curved portion 270 has the first curved portion 271 and the second curved portion 272 and is formed in the S-shape, to thereby more increase a length of the protrusion plate portion 242 in a limited space between the terminal fitting main body portion 241 and the connection terminal 28.

A tinsel wire 22 as a conductive member connected to a coil of a diaphragm drive portion 202 of the sounding body 20 is locked to a hook 221 provided on the terminal fitting 24 and is soldered to the terminal fitting 24. In FIG. 16, hatched dotted lines are attached to a soldered portion 248 where the tinsel wire 22 and the terminal fitting 24 are soldered to each other. In this example, it is conceivable that the vibration generated when the sounding body 20 generates sound, the vibration transmitted from the vehicle to which the sound generating device is attached, or a repetitive stress caused by the expansion and contraction of each constituting member of the sound generating device due to a change in an environmental temperature acts on the soldered portion 248. It is preferable that the sound generating device has a configuration that reduces the vibrations and the repetitive stress on the soldered portion 248 for the purpose of reducing a metal fatigue. In view of the above, the sound generating device according to the fourth embodiment is configured as described above, thereby being capable of obtaining the following operation and effects.

In the fourth embodiment, at least one or more curved portions 270 are formed on the protrusion plate portion 242 of the terminal fitting 24. As a result, a distance between the root portion 250 and the fitting portion 260 is increased through the curved portion 270. For that reason, the protrusion plate portion 242 can absorb the vibration generated when the sounding body 20 generates sound, the vibration transmitted from the vehicle to which the sound generating device is attached, or a repetitive stress caused by the expansion and contraction of each constituting member of the sound generating device due to a change in an environmental temperature by the curved portion 270. Therefore, the sound generating device reduces the stress acting on the soldered portion 248 connecting the terminal fitting main body portion 241 and the tinsel wire 22, making it possible to prevent breakage of the soldered portion 248. Furthermore, the sound generating device prevents a contact failure between the groove portion 281 of the connection terminal 28 and the fitting portion 260 of the protrusion plate portion 242, making it possible to reduce a change in an electric resistance value at the contact portion. Therefore, the sound generating device can maintain the sound generating function over a long period of time.

In the fourth embodiment, the curved portion 270 is curved along a plane having a normal line in a plate thickness direction of the metal plate material forming the protrusion plate portion 242. According to the above configuration, the metal plate material is punched during manufacturing the terminal fitting 24, thereby being capable of forming the root portion 250, the fitting portion 260, and the curved portion 270 of the protrusion plate portion 242 at the same time. In other words, the curved portion 270 can be formed without bending the metal plate in a plate thickness direction of the protrusion plate portion 242. Therefore, a manufacturing process can be simplified, and a manufacturing cost can be reduced.

In the fourth embodiment, the curved portion 270 is curved along an imaginary surface that intersects with a direction in which inner walls of the groove portion 281 into which the protrusion plate portion 242 is fitted face each other. According to the above configuration, the protrusion plate portion 242 of the terminal fitting 24 can be set with a necessary length for the protrusion plate portion 242 without curving the curved portion 270 in a direction in which the inner walls of the groove portion 281 face each other. Therefore, the sound generating device can downsize the body size of the protrusion plate portion 242 in the direction in which the inner walls of the groove portion 281 face each other.

In the fourth embodiment, the curved portion 270 has the first curved portion 271 and the second curved portion 272, thereby being capable of more increasing the length of the curved portion 270. For that reason, the protrusion plate portion 242 can reliably absorb the vibration generated when the sounding body 20 generates sound, the vibration transmitted from the vehicle to which the sound generating device is attached, or a repetitive stress caused by the expansion and contraction of each constituting member of the sound generating device due to a change in an environmental temperature by the first and second curved portions 271 and 272. Therefore, the sound generating device can prevent breakage of the soldered portion 248 connecting the terminal fitting main body portion 241 to the tinsel wire 22, and prevent a contact failure between the groove portion 281 of the connection terminal 28 and the fitting portion 260 of the protrusion plate portion 242.

In the fourth embodiment, the portion 27a of the outer periphery of the first curved portion 271 on the root portion 250 side is located closer to the root portion 250 than the portion 27b of the outer periphery of the second curved portion 272 on the side opposite to the root portion 250. According to the above configuration, the lengths of the first curved portion 271 and the second curved portion 272 can be more increased within a limited space between the terminal fitting main body portion 241 and the connection terminal 28. With the above configuration, the curved portion 270 is formed into an S shape, and can be displaced in any direction of three dimensions with a low force. For that reason, the protrusion plate portion 242 can reliably absorb the vibration generated when the sounding body 20 generates sound, the vibration transmitted from the vehicle to which the sound generating device is attached, or a repetitive stress caused by the expansion and contraction of each constituting member of the sound generating device due to a change in an environmental temperature by the curved portion. Therefore, the sound generating device can prevent breakage of the soldered portion 248 connecting the terminal fitting main body portion 241 to the tinsel wire 22, and prevent a contact failure between the groove portion 281 of the connection terminal 28 and the fitting portion 260 of the protrusion plate portion 242.

The present disclosure is not limited to the above embodiments, but can appropriately change within a scope of the present disclosure.

In addition, each of the above-described embodiments is related to each other, and can be appropriately combined with each other except for a case where the combination is apparently impossible.

Further, in each of the above-mentioned embodiments, it goes without saying that components of the embodiment are not necessarily essential except for a case in which the components are particularly clearly specified as essential components, a case in which the components are clearly considered in principle as essential components, and the like.

In the above-described respective embodiments, when numerical values such as the number, figures, quantity, a range of configuration elements in the embodiments are described, the numerical values are not limited to a specific number, except when the elements are particularly specified as indispensable and the numerical values are obviously limited to the specific number in principle.

In the above-described respective embodiments, when a shape, a positional relationship, and the like of a configuration element and the like are mentioned, the shape, the positional relationship, and the like are not limited thereto excluding a particularly stated case and a case of being limited to specific shape, positional relationship, and the like based on the principle.

In the fourth embodiment, the curved portion 270 includes the first curved portion 271 and the second curved portion 272. On the other hand, in other embodiments, the curved portion 270 may have at least one or more curved portions. In addition to the first curved portion 271 and the second curved portion 272, the curved portion 270 may have three or more curved portions.

In the fourth embodiment, the curved portion 270 is curved in an arc shape. On the other hand, in other embodiments, the curved portion 270 may be curved in a square shape, for example.

In the fourth embodiment, the curved portion 270 is formed in an S shape when the protrusion plate portion 242 is viewed from the plate thickness direction. On the other hand, in other embodiments, the curved portion 270 can be formed with various shapes excluding straight, such as a U shape, a W shape, a Z shape, or the like.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A sound generating device, comprising:
a sounding body that receives an electric signal and generates a sound;
a terminal fitting electrically connected to the sounding body through a conductive member;
a base to which the sounding body is attached; and
a connection terminal that is fixed to the base in a state of penetrating through the base and has a portion protruding outward of the base and being electrically connected to an external equipment, wherein
the connection terminal is made of a metal plate material and has a portion protruding inward of the base and being provided with a groove portion having an open end, and
the terminal fitting is made of a metal plate material and includes a terminal fitting main body portion mechanically joined to the sounding body and soldered to the conductive member, and a protrusion plate portion that extends from the terminal fitting main body portion and press-fitted to the groove portion from the open end of the groove portion of the connection terminal.

2. The sound generating device according to claim 1, wherein a length of the protrusion plate portion adjacent to the terminal fitting main body portion, along a direction of press-fitting of the protrusion plate portion to the groove portion, is larger than a length of the protrusion plate portion adjacent to a tip end of the protrusion plate portion.

3. The sound generating device according to claim 1, wherein the protrusion plate portion has a bent portion between an end portion of the protrusion plate portion adjacent to the terminal fitting main body portion and a portion of the protrusion plate portion press-fitted to the groove portion.

4. The sound generating device according to claim 1, wherein the protrusion plate portion of the terminal fitting includes a root portion connected to the terminal fitting main body portion, a fitting portion fitted to the groove portion of the connection terminal, and a curved portion curved between the root portion and the fitting portion.

5. The sound generating device according to claim 4, wherein the curved portion is curved along a plane whose normal line is parallel to a plate thickness direction of the metal plate material forming the protrusion plate portion.

6. The sound generating device according to claim 4, wherein the curved portion is curved along an imaginary surface that intersects with a direction in which inner walls of the groove portion fitted to the protrusion plate portion face each other.

7. The sound generating device according to claim 4, wherein the curved portion includes a first curved portion that is curved in an arc shape convex from the fitting portion toward the root portion, and a second curved portion that is curved in an arc shape convex from the first curved portion in a direction away from the root portion.

8. The sound generating device according to claim 7, wherein a portion of an outer circumference of the first curved portion facing the root portion is located closer to the root portion than a portion of an outer circumference of the second curved portion facing away from the root portion is to the root portion.

9. The sound generating device according to claim 1, wherein the terminal fitting is integrated with the sounding body through a terminal plate made of a resin plate material.

10. The sound generating device according to claim 9, wherein the terminal fitting main body portion includes a terminal fitting main body fixing portion that is in contact with the terminal plate and soldered to the conductive member, a terminal fitting main body movable portion that is separated from the terminal fitting main body fixing portion by a slit portion and not in contact with the terminal plate, and a coupling portion that connects the terminal fitting main body fixing portion to the terminal fitting main body movable portion, and the protrusion plate portion extends from a free end of the terminal fitting main body movable portion toward the connection terminal.

11. The sound generating device according to claim 9, wherein the sounding body includes a diaphragm that vibrates to generate sound, a diaphragm drive portion that vibrates the diaphragm, and a frame that houses the diaphragm drive portion, and the frame and the terminal plate are mechanically joined together.

12. A sound generating device, comprising:
a sounding body that receives an electric signal to generate sound;
a base to which the sounding body is attached;
a terminal fitting electrically connected to the sounding body through a conductive member, the terminal fitting having a metal plate which includes a terminal fitting main body portion that is mechanically joined to the sounding body and soldered to the conductive member, and a protrusion plate portion that extends from the terminal fitting main body portion; and
a connection terminal having a metal plate fixed to the base in a state of penetrating through the base, the connection terminal being electrically connected to an external equipment outside the base, and the connection terminal having a groove press-fitted to the protrusion plate portion inside the base.

* * * * *